(12) United States Patent
Shimura

(10) Patent No.: US 8,954,002 B2
(45) Date of Patent: Feb. 10, 2015

(54) WIRELESS COMMUNICATION APPARATUS INCLUDING HIGH-FREQUENCY COUPLER

(75) Inventor: Hajime Shimura, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/914,375

(22) Filed: Oct. 28, 2010

(65) Prior Publication Data

US 2011/0130094 A1 Jun. 2, 2011

(30) Foreign Application Priority Data

Dec. 1, 2009 (JP) ................................. 2009-273886

(51) Int. Cl.
*H04B 5/00* (2006.01)
*H04B 7/00* (2006.01)
*H01Q 1/24* (2006.01)

(52) U.S. Cl.
CPC .................................... *H04B 5/0012* (2013.01)
USPC .......................... 455/41.1; 455/41.3; 343/702

(58) Field of Classification Search
USPC ........ 455/41.1–41.3; 343/700, 702, 846, 767, 343/770, 818, 787
See application file for complete search history.

(56) References Cited

U.S. PATENT DOCUMENTS

| | | | |
|---|---|---|---|
| 7,750,851 B2 | 7/2010 | Washiro | |
| 8,125,394 B2 * | 2/2012 | Chiang | 343/702 |
| 2003/0001781 A1 * | 1/2003 | Konishi | 343/700 MS |
| 2008/0064331 A1 * | 3/2008 | Washiro | 455/41.1 |
| 2008/0076351 A1 * | 3/2008 | Washiro | 455/41.1 |
| 2008/0125036 A1 * | 5/2008 | Konya et al. | 455/41.1 |
| 2008/0153416 A1 * | 6/2008 | Washiro | 455/41.1 |
| 2008/0311849 A1 * | 12/2008 | Washiro | 455/41.1 |
| 2009/0058734 A1 * | 3/2009 | Ali et al. | 343/702 |
| 2010/0056046 A1 * | 3/2010 | Tomoda | 455/41.1 |
| 2010/0085258 A1 * | 4/2010 | Teshima et al. | 343/700 MS |
| 2010/0134361 A1 * | 6/2010 | Nakano | 343/702 |
| 2010/0233958 A1 * | 9/2010 | Washiro | 455/41.1 |

FOREIGN PATENT DOCUMENTS

| | | | |
|---|---|---|---|
| JP | 2008-099235 A | 4/2008 | |
| JP | 2008-099236 A | 4/2008 | |
| JP | 2008-103902 A | 5/2008 | |
| JP | 2008-271605 A | 6/2008 | |
| JP | 05451345 B2 | 3/2014 | |

\* cited by examiner

*Primary Examiner* — Andrew Wendell
*Assistant Examiner* — Cindy Trandai
(74) *Attorney, Agent, or Firm* — Carter, DeLuca, Farrell & Schmidt, LLP

(57) ABSTRACT

A wireless communication apparatus includes a coupling electrode of a high-frequency coupler for executing wireless communication; and a housing of the wireless communication apparatus. A dielectric material or a magnetic material or a conducting material is disposed between coupling electrodes and the housing so that a plurality of faces of the material is in contact with a plurality of faces of the housing of the wireless communication apparatus.

18 Claims, 9 Drawing Sheets

ALIGNMENT OF DIGITAL CAMERA CAPABLE OF CLOSE PROXIMITY WIRELESS COMMUNICATION ACCORDING TO FIRST EMBODIMENT

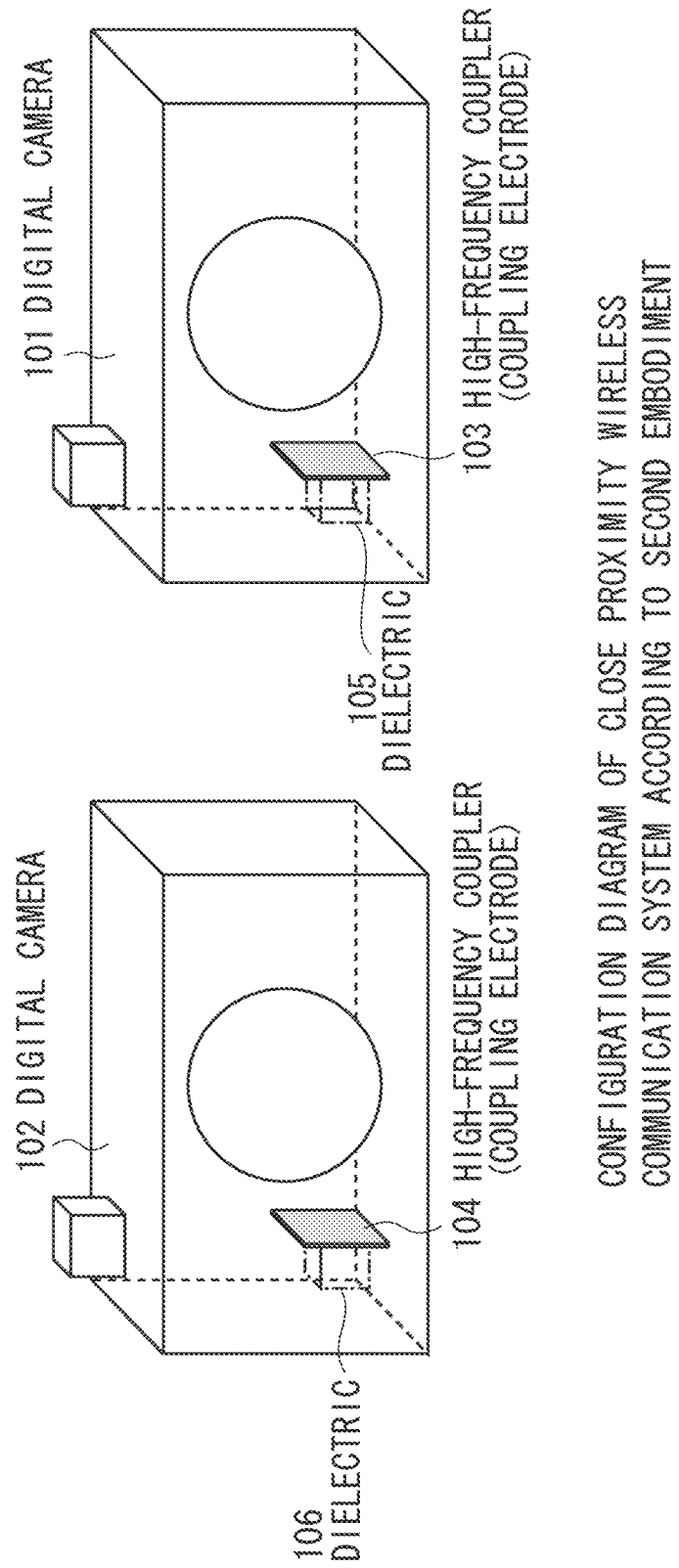

COUPLING ELECTRODE LOADING RECTANGULAR SOLID DIELECTRIC

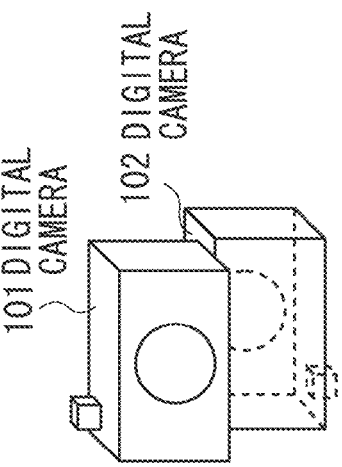
FIG. 7C
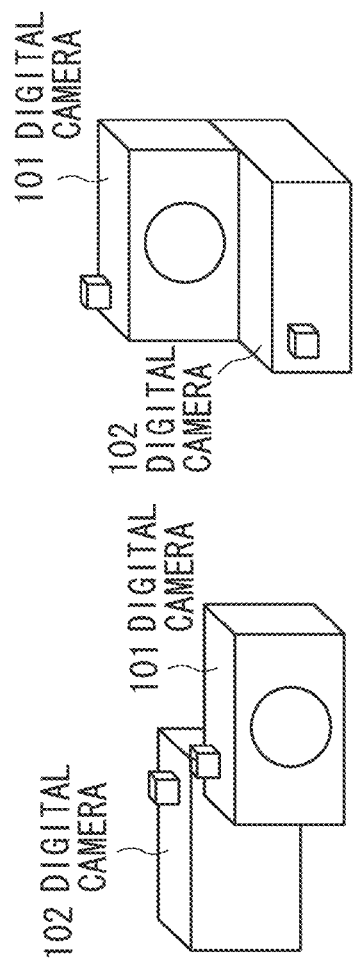
FIG. 7B
FIG. 7A
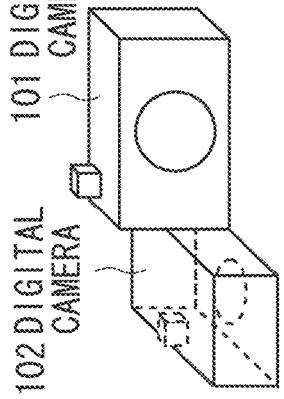
FIG. 7F
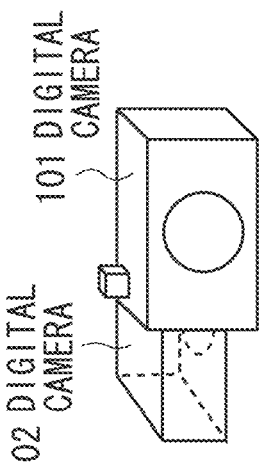
FIG. 7E
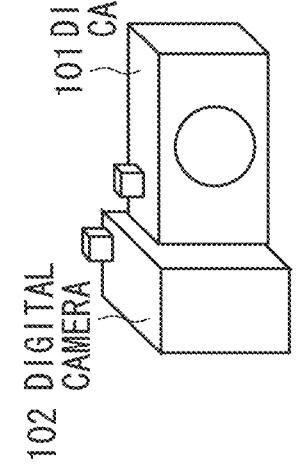
FIG. 7D
ALIGNMENT OF DIGITAL CAMERA CAPABLE OF CLOSE PROXIMITY WIRELESS COMMUNICATION ACCORDING TO SECOND EMBODIMENT

COUPLING ELECTRODE LOADING A HEMISPHERICAL SOLID DIELECTRIC

WIRELESS COMMUNICATION APPARATUS INCLUDING HIGH-FREQUENCY COUPLER

BACKGROUND OF THE INVENTION

1. Field of the Invention

The present invention relates to a wireless communication apparatus, and in particular relates to a configuration mounting a high-frequency coupler on a wireless communication apparatus.

2. Description of the Related Art

Standards for wireless communication include wireless LAN such as IEEE802.11 or Bluetooth (Registered Trademark). These techniques propagate electrical waves into space using a radiation electric field that is generated from an antenna to thereby enable communication between apparatuses.

By contrast a communication method, such as radio frequency identification (RFID), has been proposed that uses an electrostatic field or an induction field in substitution for a radiation electric field. This communication method communicates with a low-frequency signal using an electrical field coupling method or an electromagnetic induction method. Since this communication method communicates using a low-frequency signal, the communication speed is slow, and therefore large-capacity data communication is difficult.

In contrast to conventional RFID, a close proximity wireless communication system that enables large-capacity data communication or a configuration of a high-frequency coupler used for such a system has been proposed. Such a system uses an electrical field coupling method, an electromagnetic induction method, or an induction field method caused by an electrostatic coupling method to thereby transmit high-frequency and wide-band signals (for example, refer to U.S. Pat. No. 7,750,851 (Japanese Patent Application Laid-Open No. 2008-154198) or US 2008/0076351 (Japanese Patent Application Laid-Open No. 2008-271606)).

Furthermore a communication apparatus design or an arrangement between a transmitter and receiver has been proposed to expand the distance between the coupling electrodes of a transmitter and receiver by electrical field coupling (for example, US 2008/0153416 (Japanese Patent Application Laid-Open No. 2008-271605, Japanese Patent Application Laid-Open No. 2008-099235), US 2008/0076351 (Japanese Patent Application Laid-Open No. 2008-099236)).

In an close proximity wireless communication system as described above, data communication is performed between a transmitter and a receiver via a high-frequency coupler that includes a coupling electrode configured as a flat plate. Even when the transmitter and the receiver are disposed in close proximity, unless the coupling electrodes of the transmitting side and the receiving side are opposed to each other and the coupling electrodes are superimposed to some extent, there is a considerable deterioration in transmission characteristics. Furthermore, when the coupling electrode of the receiver facing the transmitter is assumed to be positioned at a plurality of positions for example, a plurality of coupling electrodes must be provided on the transmitter in correspondingly opposing positions.

SUMMARY OF THE INVENTION

The present invention is directed to the flexible disposition of a transmitter-receiver when performing wireless communication to thereby enable wireless communication even when the respective coupling electrodes of the transmitter and the receiver are not opposed to each other.

According to an aspect of the present invention, a wireless communication apparatus includes a coupling electrode of a high-frequency coupler for executing wireless communication; and a housing of the wireless communication apparatus. Material for a dielectric or a magnetic body or a conducting body is disposed between coupling electrodes and the housing so that a plurality of faces of the material is in contact with a plurality of faces of the housing of the wireless communication apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a configuration diagram of a close proximity wireless communication system according to a second exemplary embodiment.

FIGS. 7A, 7B, 7C, 7D, 7E, 7F illustrate the disposition of a digital camera enabling close proximity wireless communication according to the second exemplary embodiment.

DESCRIPTION OF THE EMBODIMENTS

Various exemplary embodiments, features, and aspects of the invention will be described in detail below with reference to the drawings.

The present exemplary embodiment describes a close proximity wireless communication system in which a high-frequency and wide-band communication signal is transmitted through a high-frequency coupler. The scope of application of the present invention includes not only close proximity wireless communication systems which transmit a high-frequency and wide-band communication signal but also can be applied to a close proximity wireless communication system that transmits another communication signal.

Figure 2:
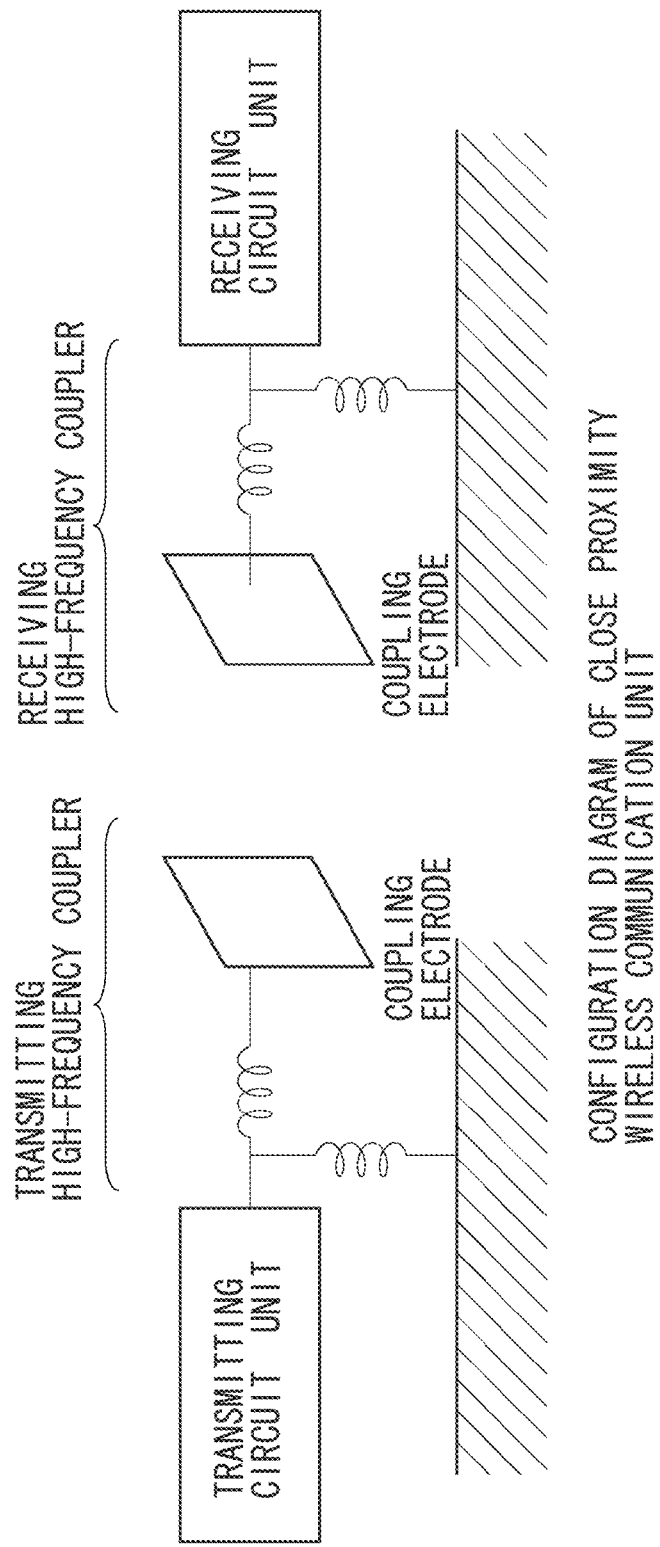
FIG. 2 is a configuration diagram of a close proximity wireless communication unit.

FIG. 2 illustrates an example of a configuration for an close proximity wireless communication unit using an electrostatic field or a dielectric field. As illustrated in FIG. 2, when the coupling electrodes of the respective high-frequency couplers of a transmitter-receiver are disposed in an opposed configuration, the two electrodes function as a single capacitor, and overall operate as a band-pass filter to thereby enable transmission of a high-frequency signal in an efficient manner between the two high-frequency couplers. When the opposed coupling electrodes do not overlap to a certain degree, the transmission characteristics deteriorate and communication cannot be executed. Furthermore as the distance between the coupling electrodes increases, the transmission characteristics deteriorate and communication cannot be executed. When a wire-shaped, plate-like or band-shaped dielectric is provided between the coupling electrodes, propagation of plane waves is effectively enabled through the inner portion and surface of the dielectric.

When a plane wave is incident from a medium with a large dielectric constant upon a medium with a small dielectric constant, complete reflection results when the angle of incidence is greater than or equal to a certain angle. Furthermore an evanescent wave has an amplitude which attenuates exponentially from an interfacial boundary outwardly, and does not irradiate energy. This transmission path is termed a surface wave transmission path. When a wire-shaped, plate-like or band-shaped dielectric is provided between the coupling electrodes, these dielectrics function as a surface wave transmission path. In the present invention, the above principle is used to improve the degree of freedom when communication is performed between apparatuses that have high-frequency couplers, and thereby enable communication while maintaining preferred transmission characteristics without opposing the coupling electrodes to each other.

Figure 3:
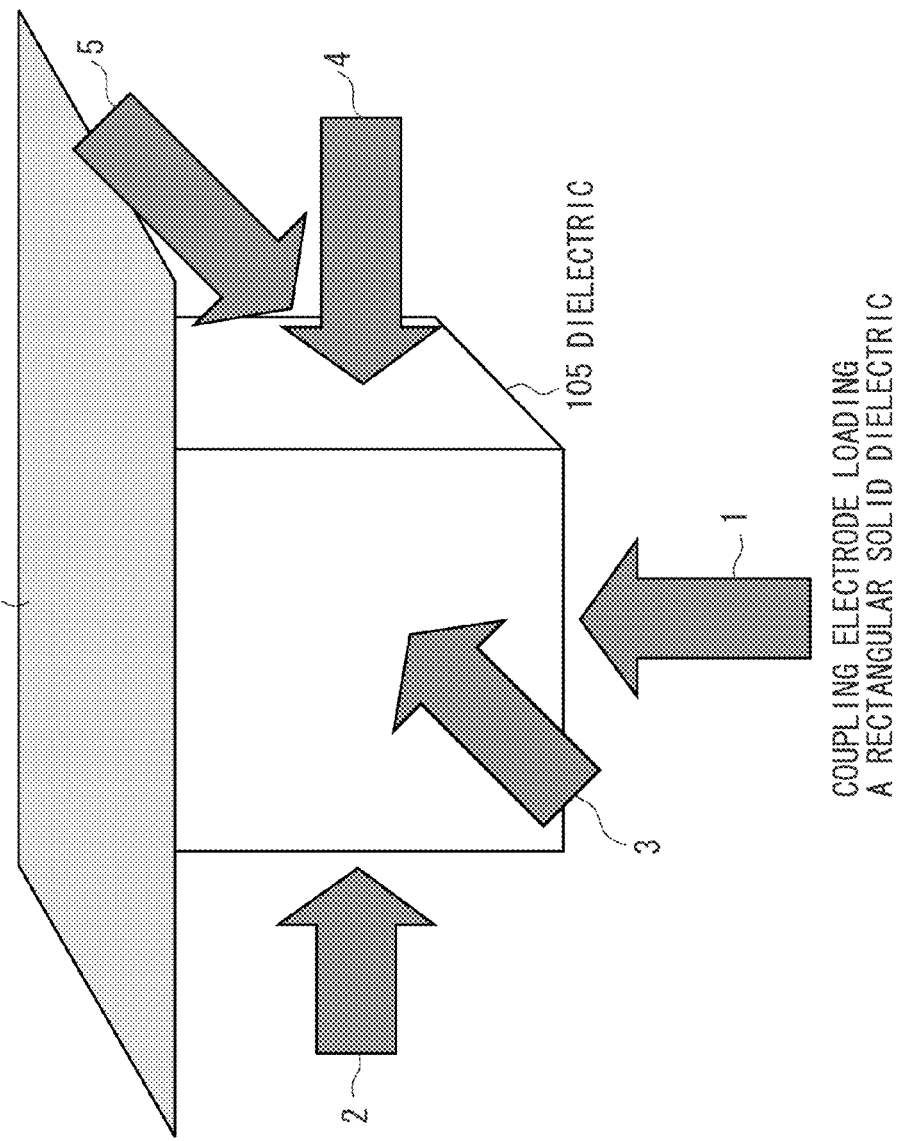
FIG. 3 illustrates a coupling electrode loaded with a rectangular solid dielectric.

FIG. 3 illustrates a rectangular solid dielectric 105 that is loaded on the coupling electrodes of the high-frequency coupler 103. The dielectric 105 may contact the coupling electrodes or may be disposed nearby. However since the transmission characteristics deteriorates as the distance from the coupling electrodes increases, the dielectric preferably contacts the coupling electrodes. "Nearby" as used herein means within a range enabling close proximity wireless communication as described below. The loading of a rectangular solid dielectric can maintain favorable communication showing transmission characteristics similar to communication performed by opposing coupling electrodes to each other, in which the corresponding coupling electrode is opposed to any face 1-5 of the dielectric 105. In other words, although conventionally the coupling electrodes must be opposed to each other, the degree of freedom in communication can be improved by the present invention even when the coupling electrodes do not face each other.

Figure 1:
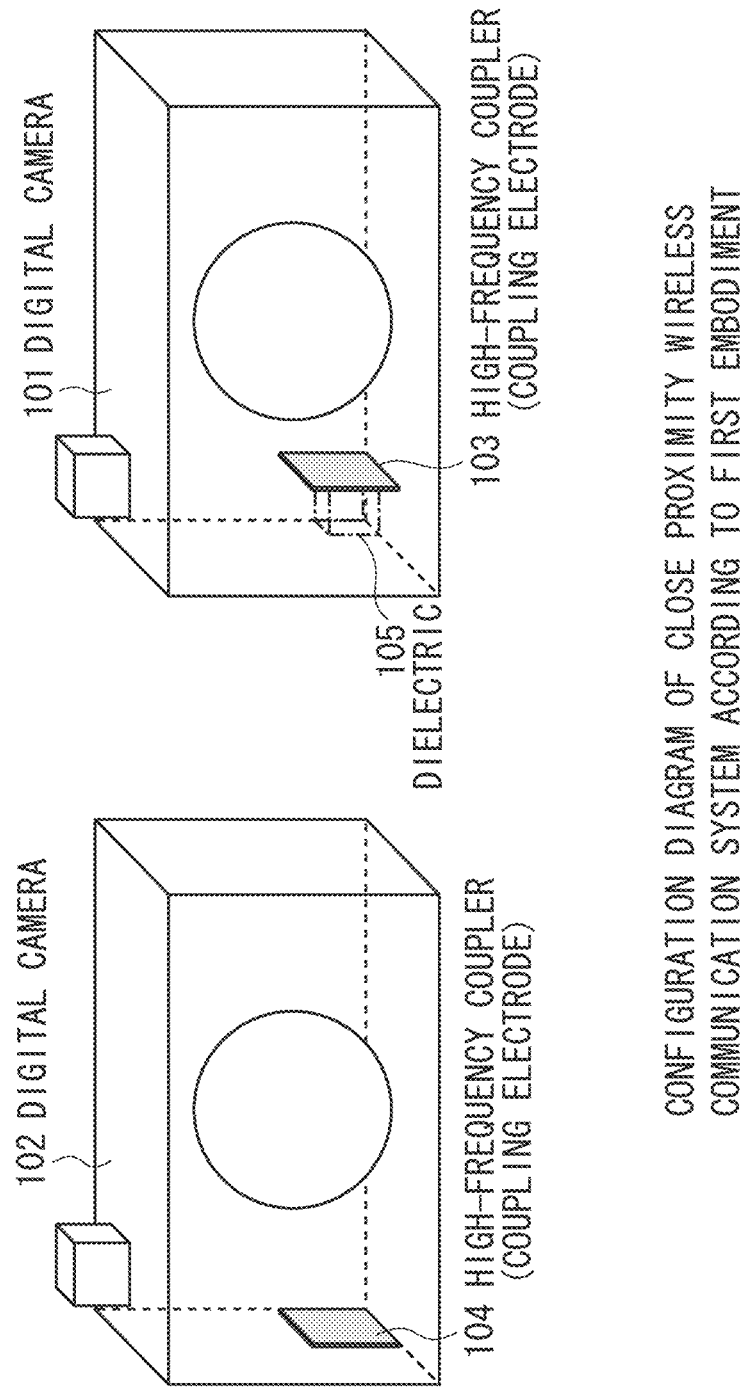
FIG. 1 is configuration diagram of a close proximity wireless communication system according to a first exemplary embodiment.

FIG. 1 illustrates a wireless communication system according to an aspect of the present invention. The present exemplary embodiment describes close proximity wireless communication between a transmitter digital camera 101 and a receiver digital camera 102. The digital camera 101 includes a high-frequency coupler 103. The digital camera 102 includes a high-frequency coupler 104. The digital camera 101 load a rectangular solid dielectric 105 between the high-frequency coupler 103 and the housing. The dielectric 105 is disposed in contact with a plurality of surfaces of the housing of the digital camera 101. In FIG. 1, the dielectric 105 illustrated in the example is in contact with the back surface, right surface and bottom surface of the housing. However, it may be in contact with (or adjacent to) other surfaces. The dielectric 105 may not necessarily make contact with the housing. However since the transmission characteristics deteriorate when the distance from the housing increases, it is preferable that the dielectric contacts or is adjacent to the housing. As used herein, "adjacent" means a scope that realizes close proximity wireless communication. A dielectric is not loaded on the coupling electrode of the high-frequency coupler 104 that is included in the digital camera 102.

Figure 4B:
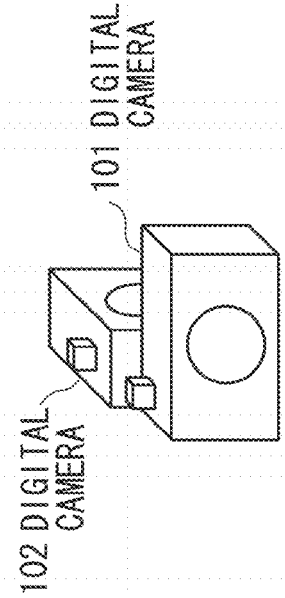
FIGS. 4A, 4B, 4C illustrate the disposition of a digital camera enabling close proximity wireless communication according to the first exemplary embodiment.
Figure 4A:
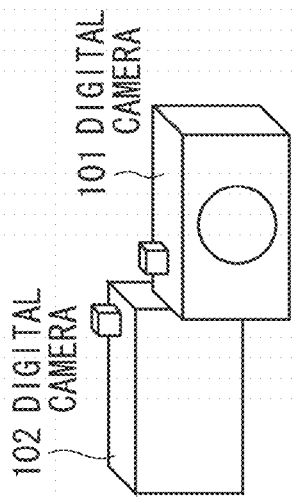
Figure 4C:
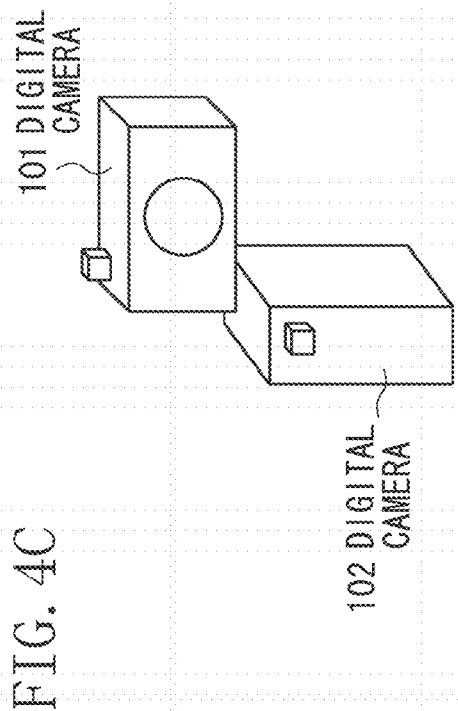

It is assumed that close proximity wireless communication is performed between the digital camera 101 and the digital camera 102 having the above configuration. In the example illustrated in FIG. 1, the dielectric 105 of the digital camera 101 is in contact with the back surface, right surface and bottom surface of the housing. Thus when the coupling electrode of the digital camera 102 is positioned facing the back surface, right surface and bottom surface of the digital camera 101, propagation loss in the electromagnetic waves can be reduced, and thereby communication with favorable transmission characteristics can be performed. FIGS. 4A to 4C illustrate an example of communication between the digital camera 101 and the digital camera 102. In FIG. 4A, the digital camera 102 is oriented backwards, and the right face of the digital camera 101 (the dielectric 105 is disposed) is opposed to the right face of the digital camera 102 (where the coupling electrode is disposed). In FIG. 4B, the back surface of the digital camera 101 (where the dielectric 105 is disposed) is opposed to the right face of the digital camera 102 (where the coupling electrode is disposed). In FIG. 4C, the digital camera 102 is standing, and the bottom face of the digital camera 101 (where the dielectric 105 is disposed) is opposed to the right face of the digital camera 102 (where the coupling electrode is disposed).

As described above, close proximity wireless communication is enabled without opposing the transmitter to receiver coupling electrodes. Since the rectangular solid dielectric is loaded between the coupling electrode and the housing of the digital camera 101 in a manner such that a plurality of faces of the dielectric is in contact with or adjacent to a plurality of faces of the housing. In other words, close proximity wireless communication is enabled without opposing the transmitter to receiver coupling electrodes when a plurality of faces of the rectangular solid dielectric is loaded between the coupling electrodes to face a plurality of faces of the housing of the digital camera 101. Therefore flexibility can be obtained in the orientation of the apparatuses that execute close proximity wireless communication. The shape of the dielectric is not limited to rectangular solid. As long as it takes a shape corresponding to the shape of the housing of the wireless communication apparatus loaded with the dielectric, the plurality of faces of the dielectric can be in contact with or adjacent to a plurality of the faces of the housing. In other words, when the shape of the housing is rectangular as illustrated in FIG. 1, if the dielectric is rectangular solid, the dielectric is easily arranged.

In the first exemplary embodiment, although a dielectric is loaded on the coupling electrode 103 of the transmitter digital camera 101, in the second exemplary embodiment, as illustrated in FIG. 5, a dielectric is loaded on the coupling electrodes of both the transmitter digital camera 101 and the receiver digital camera 102. A rectangular solid dielectric 106 is loaded between the high-frequency coupler 104 and the housing in the receiver digital camera 102, and the dielectric 106 is disposed in contact with a plurality of faces of the housing of the digital camera 102. In FIG. 5, the dielectric 106 is in contact with the back face, the right face and the bottom face of the housing. However the dielectric 106 may be in contact with (or adjacent to) other surfaces. The dielectric 106 may not necessarily make contact with the housing. However since the transmission characteristics deteriorate when the distance from the housing increases, it is preferable that the dielectric is in contact with or adjacent to the housing.

Figure 6A:
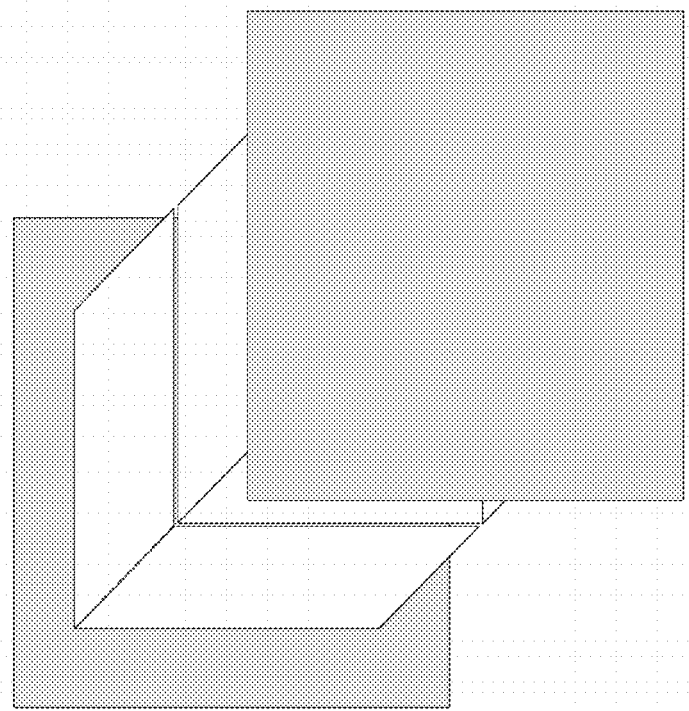
FIGS. 6A, 6B illustrate a coupling electrode loaded with a rectangular solid dielectric.
Figure 6B:
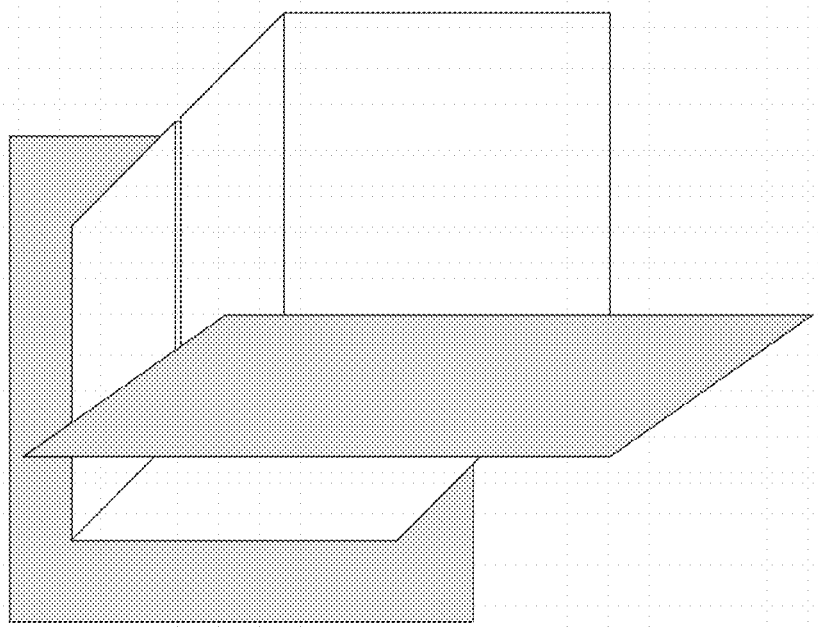

When the coupling electrodes are facing each other as illustrated in FIG. 6A, the electromagnetic wave propagates between the coupling electrodes through the dielectric and therefore preferred communication characteristics can be obtained. As illustrated in FIG. 6B, even when the coupling electrodes are not opposed to each other, preferred communication characteristics are obtained since the electromagnetic waves propagate through the dielectric.

Since the rectangular solid dielectric is provided on the transmitter and the receiver coupling electrode, the digital camera 101 and the digital camera 102 can perform close proximity wireless communication as illustrated in FIG. 7A-F. In FIG. 7A, the digital camera 102 is placed sideways and the right face of the digital camera 101 (where the dielectric 105 is disposed) is opposed to the back face of the digital camera 102 (the dielectric 106 is disposed). In FIG. 7B, the digital camera 102 is placed backwards and the back face of the digital camera 101 (where the dielectric 105 is disposed) is opposed to the back face of the digital camera 102 (where the dielectric 106 is disposed). In FIG. 7C, the digital camera 102 is placed prone and the bottom face of the digital camera 101 (where the dielectric 105 is disposed) is opposed to the back face of the digital camera 102 (where the dielectric 106 is disposed). In FIG. 7D, the digital camera 102 is placed prone and the right face of the digital camera 101 (where the dielectric 105 is disposed) is opposed to the bottom face of the digital camera 102 (where the dielectric 106 is disposed). In FIG. 7E, the digital camera 102 is placed prone and the back face of the digital camera 101 (where the dielectric 105 is disposed) is opposed to the bottom face of the digital camera 102 (where the dielectric 106 is disposed). In FIG. 7F, the digital camera 102 is placed backwards and the bottom face of the digital camera 101 (where the dielectric 105 is disposed) is opposed to the bottom face of the digital camera 102 (where the dielectric 106 is disposed).

As described above, preferred communication characteristics can be obtained without opposing the transmitter-receiver coupling electrodes to each other by loading a rectangular solid dielectric on the transmitter and the receiver coupling electrodes. Furthermore more flexibility in the disposition of the devices than the first exemplary embodiment can be obtained by loading a square dielectric on the transmitter and the receiver coupling electrodes.

In the first and the second exemplary embodiments, close proximity wireless communication is enabled between digital cameras including a short-distance wireless communication function.

Figure 8:
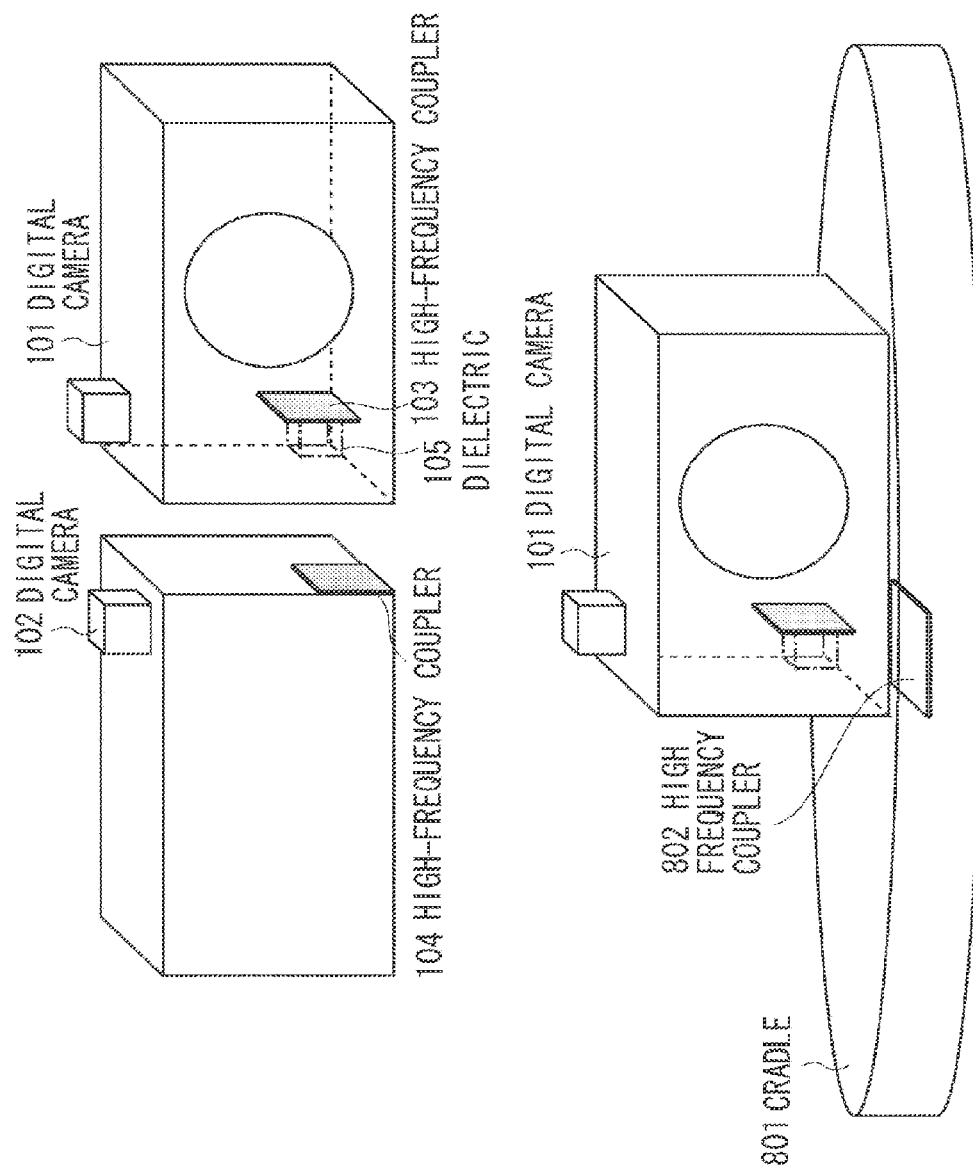
FIG. 8 is a configuration diagram of a close proximity wireless communication system according to a third exemplary embodiment.

As illustrated in FIG. 8, the third exemplary embodiment describes the transmitter digital camera 101 performing close proximity wireless communication either with the receiver digital camera 102 or a receiver cradle 801.

As illustrated in FIG. 1, a high-frequency coupler 103 provided with coupling electrodes loaded with a rectangular solid dielectric is disposed in the corners of the housing of the transmitter digital camera 101 in the same manner as the first exemplary embodiment. The dielectric is not loaded in the coupling electrodes of the high-frequency coupler 104 provided in the digital camera 102. The dielectric is not provided in the coupling electrodes of the high-frequency coupler 802 provided in the cradle 801.

When the digital camera 101 and the digital camera 102 perform close proximity wireless communication, in the same manner as the first exemplary embodiment, flexibility can be obtained in the disposition of the digital camera 101 and the digital camera 102 during close proximity wireless communication.

Next, a configuration will be described in which the digital camera 101 is disposed on the cradle 801, and close proximity wireless communication is performed between the digital camera 101 and the cradle 801. In this case, the coupling electrodes between the digital camera 101 and the cradle 801 are not opposed to each other. However preferred communication characteristics can be obtained when the coupling electrodes of the cradle 801 are disposed in various directions as shown by 1-5 in FIG. 3.

As described above, since connection is made in each direction as illustrated in FIG. 3 as a result of loading a dielectric on the coupling electrodes, close proximity wireless communication is possible even when the transmitter and the receiver coupling electrodes are not opposed to each other. Therefore flexibility can be obtained in the disposition of devices executing close proximity wireless communication.

Figure 9:
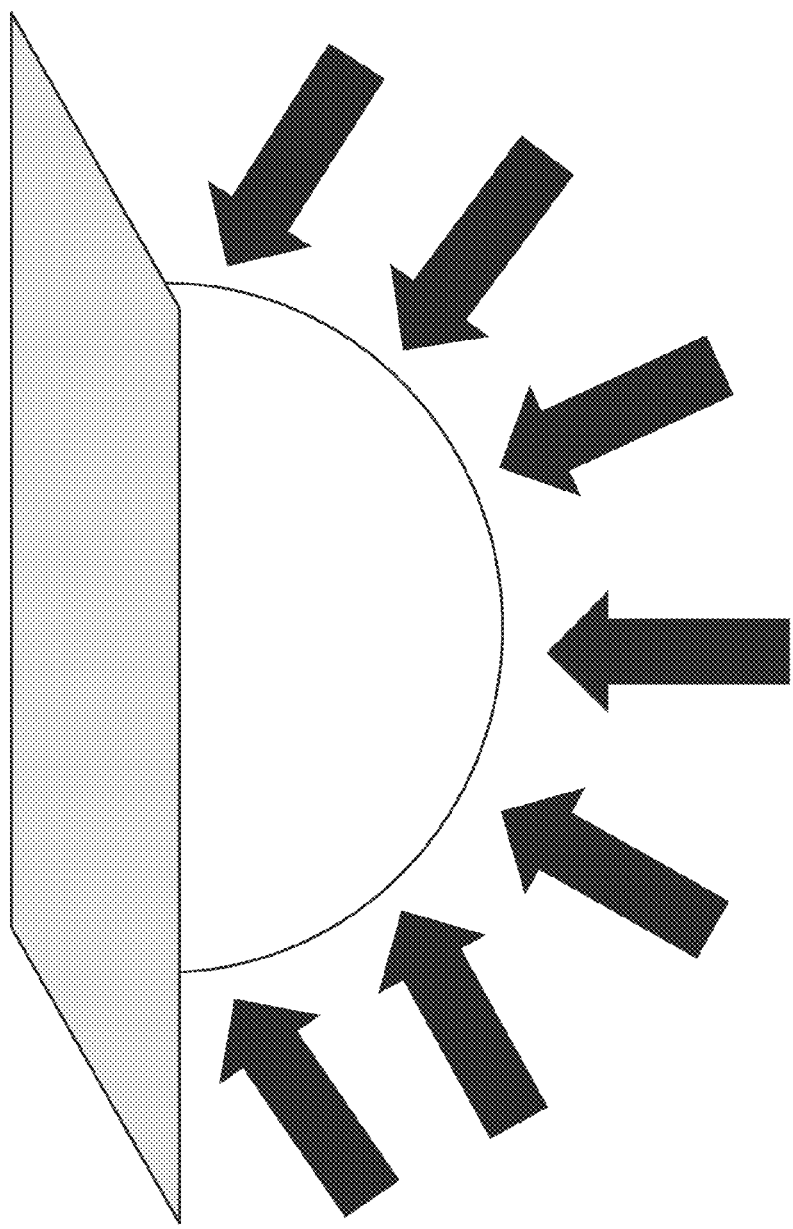
FIG. 9 illustrates a coupling electrode loaded with a hemispherical dielectric.

The fourth exemplary embodiment describes the shape of the dielectric loaded in the coupling electrode. The first exemplary embodiment and the second exemplary embodiment described the mounting of a rectangular solid dielectric on the coupling electrodes. Since electromagnetic waves propagate along the surface of the dielectric or in the dielectric, the shape of the dielectric may have another shape. For example, a hemispherical solid dielectric is loaded on the coupling electrodes as illustrated in FIG. 9. In this manner, even when corresponding coupling electrode is disposed in any direction shown by the arrows in FIG. 9 instead of an opposed position, preferred communication characteristics is obtained. In this manner, electromagnetic waves will propagate along the surface of the dielectric or in the dielectric to thereby obtain preferred communication characteristics when the shape of the dielectric loaded on the coupling electrodes is in any shape. As long as the shape of the dielectric loaded on the coupling electrode is disposed along the curve or makes contact with the plurality of faces of the housing of the device storing the high-frequency coupler, close proximity wireless communication can be performed with the partner device from a plurality of directions without opposing the coupling electrodes of the transmitter and the receiver to each other. Therefore degree of freedom and flexibility in disposing the apparatuses performing close proximity wireless communication can be obtained.

Since the above characteristics are obtained even when the shape of the dielectric is complicated, for example, the dielectric above may be replaced with the wireless device housing. Furthermore in each exemplary embodiment above, although a material loaded on the coupling electrode is assumed to be dielectric body, this material may be magnetic body or conductive body. Furthermore although an close proximity wireless communication system was assumed, the present structure is applicable as a means for transmitting electrical force efficiently without opposing coupling electrodes to each other in the wireless power transmission.

According to the present invention, even when the coupling electrodes of a high-frequency coupler are not opposed to each other, communication can be performed using an electrostatic field or a dielectric field and thereby the degree of freedom of the disposition of devices in communication can be improved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-273886 filed Dec. 1, 2009, which is hereby incorporated by reference herein in its entirety.

What is claimed is:

1. A wireless transmission system comprising:
   a first wireless transmission apparatus comprising a first coupling member for wireless transmission; and a second wireless transmission apparatus comprising:
- a housing defining at least a first side, a second side, and a third side;
- a second coupling member for wireless transmission disposed within the housing; and
- a solid body of dielectric material, magnetic material, or conductive material disposed within the housing to enable wireless transmission between the first and second coupling members using coupling between the first and second coupling members in a case where the first coupling member is oriented to oppose one of the first, second, and third sides,
- wherein the single solid body is made of one solid having four or more faces, the second coupling member is positioned in contact with or adjacent to one of the four or more faces, and each of the first, second and the third sides is positioned in contact with or adjacent to a different one of three faces included in the four or more faces.

2. The wireless transmission system according to claim 1, wherein the solid body is a rectangular solid body.

3. The wireless transmission system according to claim 1, wherein at least one of the first and second coupling members includes a coil.

4. The wireless transmission system according to claim 1, wherein at least one of the first and second coupling members is for wireless communication or for wireless power transmission.

5. The wireless transmission system according to claim 1, wherein the solid body is a piece of the housing.

6. The wireless transmission system according to claim 1, wherein the first and second coupling members are coupling electrodes.

7. The wireless transmission system according to claim 1, wherein the solid body is a single piece of material.

8. The wireless transmission system according to claim 1, wherein the solid body is defined by a plurality of faces including a first face positioned adjacent to or in contact with the first side, a second face positioned adjacent to or in contact with the second side, and a third face positioned adjacent to or in contact with the third side.

9. The wireless transmission system according to claim 1, wherein the solid body is defined by a plurality of faces including a first face positioned to oppose the first side, a second face positioned to oppose the second side, and a third face positioned to oppose the second coupling member.

10. The wireless transmission system according to claim 1, wherein the wireless transmission includes wireless data transmission.

11. The wireless transmission system according to claim 1, wherein the wireless transmission includes wireless power transmission.

12. The wireless transmission system according to claim 1, wherein the wireless transmission system is a proximity wireless communication system utilizing an electrostatic field or an induction field.

13. A wireless apparatus which is able to perform wireless transmission with another wireless apparatus comprising a first coupling member for wireless transmission, the wireless apparatus comprising:
- a housing defining at least a first side, a second side, and a third side;
- a second coupling member for wireless transmission disposed within the housing; and
- a solid body of dielectric material, magnetic material, or conductive material disposed within the housing to enable wireless transmission between the first and second coupling members using coupling between the first and second coupling members in a case where the first coupling member is oriented to oppose one of the first, second, and third sides,
- wherein the single solid body is made of one solid having four or more faces, the second coupling member is positioned in contact with or adjacent to one of the four or more faces, and each of the first, second and the third sides is positioned in contact with or adjacent to a different one of three faces included in the four or more faces.

14. A wireless power transmission system comprising:
- a first wireless apparatus comprising a first member for wireless power transmission; and
- a second wireless apparatus comprising:
  - a housing defining at least a first side, a second side, and a third side;
  - a second member for wireless power transmission disposed within the housing; and
  - a solid body of dielectric material, magnetic material, or conductive material positioned within the housing to enable wireless power transmission between the first and second members in a case where the first member is oriented to oppose one of the first, second, and third sides,
  - wherein the single solid body is made of one solid having four or more faces, the second coupling member is positioned in contact with or adjacent to one of the four or more faces, and each of the first, second and the third sides is positioned in contact with or adjacent to a different one of three faces included in the four or more faces.

15. The wireless power transmission system according to claim 14, wherein the solid body is a rectangular solid body.

16. The wireless power transmission system according to claim 14, wherein at least one of the first and second members includes a coil.

17. The wireless power transmission system according to claim 14, wherein the solid body is a piece of the housing.

18. The wireless power transmission system according to claim 14, wherein the solid body is a single piece of material.

* * * * *